DEFENSIVE PUBLICATION

UNITED STATES PATENT OFFICE

Published at the request of the applicant or owner in accordance with the Notice of Dec. 16. 1969. 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 11, 1971

886 O.G. 215

T886,013

TWO-PHASE GLASS SYSTEMS AND RESISTOR COMPOSITIONS CONTAINING THE SAME

Kenneth E. Schubert, Wilmington, Del., assignor to E. I. du Pont de Nemours and Company, Wilmington, Del.

Continuation of application Ser. No. 679,525, Oct. 3, 1967. This application July 8, 1970, Ser. No. 56,156

Int. Cl. H01b *1/02*

U.S. Cl. 252—514

No Drawing. 11 Pages Specification

The particular two-phase glass system is composed of 50–70% by weight of a high melting glass and 30–50% of a low melting glass. Resistor compositions composed of finely divided noble metals and the two-phase glass system are produced, and when fired will yield smooth resistors having low contact resistance and low noise value.